(12) United States Patent
Dawkins et al.

(10) Patent No.: US 8,832,489 B2
(45) Date of Patent: Sep. 9, 2014

(54) SYSTEM AND METHOD FOR PROVIDING FAILOVER BETWEEN CONTROLLERS IN A STORAGE ARRAY

(75) Inventors: William P. Dawkins, Austin, TX (US); Stephen G. Luning, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 310 days.

(21) Appl. No.: 13/094,509

(22) Filed: Apr. 26, 2011

(65) Prior Publication Data

US 2012/0278652 A1 Nov. 1, 2012

(51) Int. Cl.
G06F 11/00 (2006.01)
G06F 11/20 (2006.01)

(52) U.S. Cl.
CPC ...... *G06F 11/2092* (2013.01); *G06F 2201/815* (2013.01); *G06F 11/2097* (2013.01)
USPC ........................................................ 714/4.11

(58) Field of Classification Search
CPC .................... G06F 11/2028; G06F 11/2046
USPC ..................................... 714/6, 4.11
See application file for complete search history.

(56) References Cited

U.S. PATENT DOCUMENTS

| | | | | |
|---|---|---|---|---|
| 5,893,086 A * | 4/1999 | Schmuck et al. | | 1/1 |
| 6,085,238 A * | 7/2000 | Yuasa et al. | | 709/223 |
| 6,601,070 B2 * | 7/2003 | Zhang et al. | | 1/1 |
| 6,754,855 B1 * | 6/2004 | Denninghoff et al. | | 714/48 |
| 6,839,740 B1 * | 1/2005 | Kiselev | | 709/214 |
| 6,868,442 B1 * | 3/2005 | Burdeau | | 709/223 |
| 6,941,384 B1 * | 9/2005 | Aiken et al. | | 709/250 |
| 7,213,246 B1 * | 5/2007 | van Rietsc et al. | | 718/1 |
| 2002/0112069 A1 * | 8/2002 | Sim | | 709/236 |
| 2003/0005350 A1 * | 1/2003 | Koning et al. | | 714/4 |
| 2003/0014524 A1 * | 1/2003 | Tormasov | | 709/226 |
| 2003/0018927 A1 * | 1/2003 | Gadir et al. | | 714/4 |
| 2003/0172305 A1 * | 9/2003 | Miwa | | 713/201 |
| 2003/0217030 A1 | 11/2003 | Byrne | | |
| 2004/0098490 A1 * | 5/2004 | Dinker et al. | | 709/229 |
| 2005/0108593 A1 * | 5/2005 | Purushothaman et al. | | 714/4 |
| 2005/0210074 A1 * | 9/2005 | Nakatani et al. | | 707/200 |
| 2006/0129667 A1 * | 6/2006 | Anderson | | 709/223 |
| 2006/0155912 A1 * | 7/2006 | Singh et al. | | 711/6 |
| 2006/0195561 A1 | 8/2006 | Keane et al. | | |
| 2007/0004659 A1 * | 1/2007 | Escher et al. | | 514/44 |
| 2007/0245167 A1 | 10/2007 | De La Cruz et al. | | |
| 2008/0126834 A1 * | 5/2008 | Sankaran et al. | | 714/4 |
| 2010/0325471 A1 | 12/2010 | Mishra et al. | | |
| 2011/0167298 A1 * | 7/2011 | Lee | | 714/18 |
| 2013/0191340 A1 * | 7/2013 | Ammanur et al. | | 707/638 |

\* cited by examiner

*Primary Examiner* — Amine Riad
(74) *Attorney, Agent, or Firm* — Larson Newman, LLP

(57) ABSTRACT

An information handling system includes first and second memories, and first, second, and third servers. The first server includes a first active application for servicing first input/output requests associated with a first disk, and for storing first state information in the first memory. The second server includes a second active application for servicing second input/output requests associated with a second disk, and for storing second state information in the second memory. The third server includes first and second standby applications, and is configured to monitor the first and second active applications, to detect a failure of the first active application, to suspend the second standby application and to activate the first standby application in response to the failure of first active application.

20 Claims, 5 Drawing Sheets

SYSTEM AND METHOD FOR PROVIDING FAILOVER BETWEEN CONTROLLERS IN A STORAGE ARRAY

FIELD OF THE DISCLOSURE

This disclosure generally relates to information handling systems, and more particularly relates to a system and method for providing failover between controllers in a storage array.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

An information handling system, such as a storage array, can provide at least two controllers for performing input/output (I/O) operations. One controller can be an active controller that services I/O request from clients, and another controller can be a standby controller that does not actively service any I/O requests. While the active controller is actively performing I/O operations, the standby controller can continually synchronize all of the state information that resides in a memory of the active controller, such as a status of the I/O requests and data contained in a write cache of the active controller, with a memory in the standby controller. In the event of a failure of the active controller, the standby controller can take over the I/O operations and can utilize the synchronized state information to perform the I/O operations. If the storage array increases in size, such that a new active controller is added, a new standby controller can be added for the new active controller to provide failover if that active controller fails.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
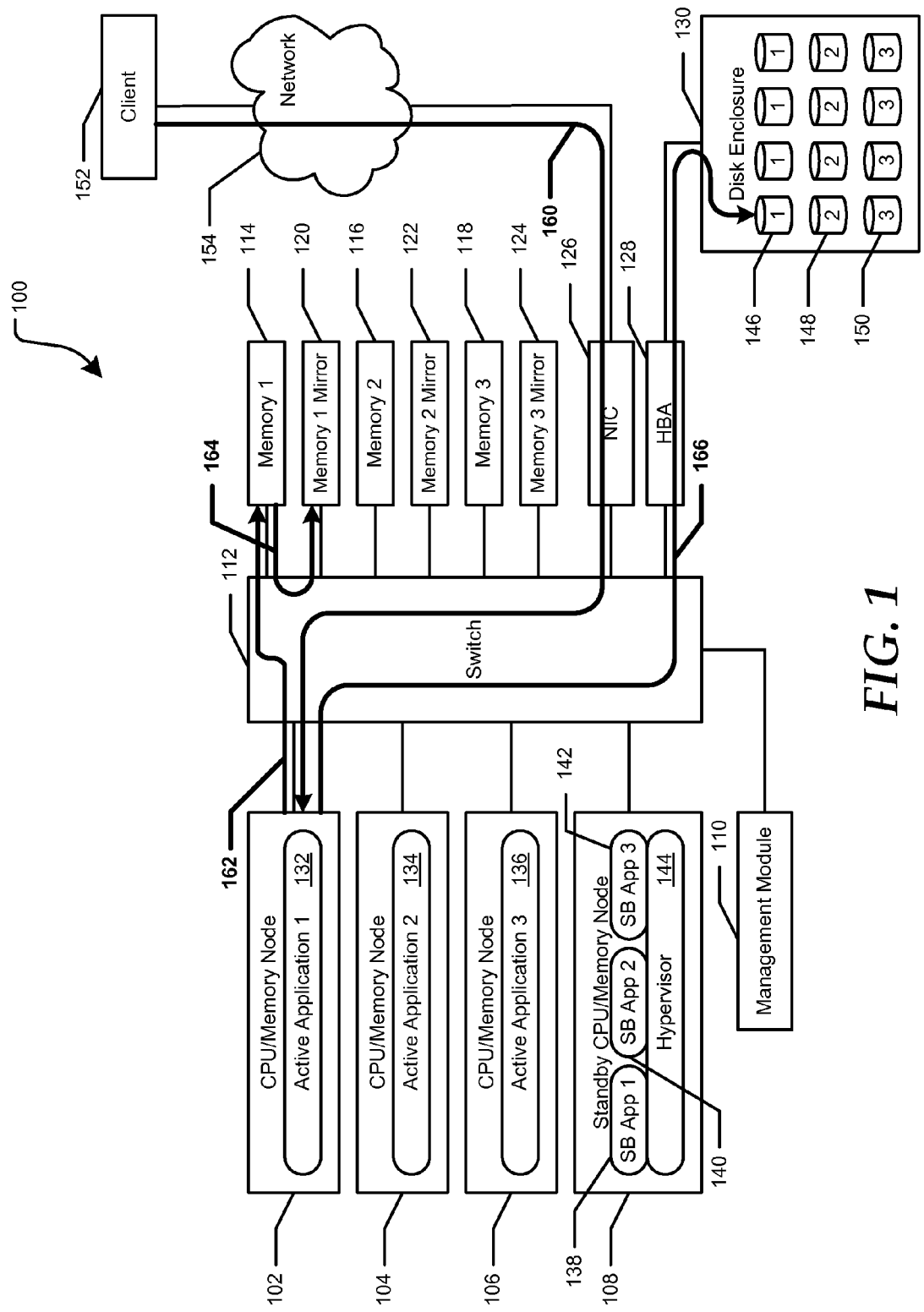
FIG. 1 is a block diagram of a storage array system.

FIG. 1 shows a storage array system 100 of information handling system. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The storage array system 100 includes central processing unit (CPU)/memory nodes 102, 104, and 106, a standby CPU/memory node 108, a management module 110, and a switch 112. The storage array system 100 also includes memories 114, 116, and 118, memory mirrors 120, 122, and 124, a network interface card (NIC) 126, a host bus adapter (HBA) 128, and a disk enclosure 130. The CPU/memory node 102 includes an active application 132, the CPU/memory node 104 includes an active application 134, and the CPU/memory node 106 includes an active application 136. The standby CPU/memory node 108 includes a first standby application 138, a second standby application 140, a third standby application 142, and a hypervisor 144. The disk enclosure 130 includes sets of disks 146, 148, and 150, such as redundant array of inexpensive disks (RAID) drives.

The CPU/memory nodes 102, 104, and 106 can be servers containing processors, memory, and other resources to run the active applications 132, 134, and 136. Similarly, the standby CPU/memory node can be a server containing processors, memory, and other resources to run the standby applications 138, 140, and 142. The standby CPU/memory node 108 can have similar capabilities as the CPU/memory nodes 102, 104, and 106, such that the standby CPU/memory node has substantially the same processing capability, memory, and other resources as each of the CPU/memory nodes. In an embodiment, the switch 112 can be a peripheral component interconnect express (PCIe) non-transparent bridging (NTB) switch to enable data exchange between the CPU/memory nodes 102, 104, 106, and 108, and the disk enclosure 130. The memories 114, 116, and 118 can be non-volatile random access memories (NVRAM), and the memory mirrors 120, 122, and 124 can also be NVRAM memories. The NIC 126 can be a multi-root input/output virtualization (MRIOV) 126, and the HBA 128 can be a MRIOV HBA.

The active application 132 of CPU/memory node 102 is in communication with the memory 114 and the memory mirror 120 via the switch 112. The active application 132 is in communication with the first set of disks 146 via the switch 112 and the HBA 128. The active application 132 is also in communication with a client 152 in a network 154 via the switch 112 and the NIC 126. Similarly, the active application 134 of CPU/memory node 104 is in communication with the memory 116 and the memory mirror 122 via the switch 112. The active application 134 is in communication with the second set of disks 148 via the switch 112 and the HBA 128. The active application 134 is also in communication with the client 152 via the switch 112 and the NIC 126. The active application 136 of CPU/memory node 106 is in communication with the memory 118 and the memory mirror 124 via the switch 112. The active application 136 is in communication with the third set of disks 150 via the switch 112 and the HBA 128. The active application 136 is also in communication with the client 152 via the switch 112 and the NIC 126.

The standby application 138 can monitor the active application 132, and can communicate with the memory 114, with the memory mirror 120, with first set of the disks 146, and with the client 152. The standby application 140 can monitor the active application 134, and can communicate with the memory 116, with the memory mirror 122, with second set of the disks 148, and with the client 152. The standby application 142 can monitor the active application 136, and can communicate with the memory 118, with the memory mirror 124, with first set of the disks 150, and with the client 152. The management module 110 is in communication with the switch 112, with the active applications 132, 134, and 136, and with the standby applications 138, 140, and 142.

During operation of the storage array system 100, the active applications 118, 120, and 122 can receive input/output (I/O) requests from the client 152 via the network 154, the NIC 126, and the switch 112. Either active application 132, 134, or 136 can service the I/O request depending on the set of disks 146, 148, or 150 associated with the I/O request. For example, the active application 134 can service the I/O request when the I/O request is associated with a disk in the second set of disks 148. While both servicing the I/O request and when the I/O request is completed, the active application 132, 134, or 136 can store state information in the memory 114, 116, or 118, which can then be mirrored for redundancy in the memory mirror 120, 122, or 124 associated with that particular active application.

For example, the active application 132 can provide Internet Small Computer System Interface (iSCSI) RAID functions to the client 152 on the network 138 to store data in the first set of disks 146. The client 152 can send an I/O request 160 associated with writing data to the first set of disks 146 to the switch 112 via the network 154 and the NIC 126. The switch 112 can then direct the I/O request 160 to the active application 132, which can process the I/O request and determine the data to write to the first set of disks 146. The active application 132 can also send the I/O request and the data to be written to the memory 114 as state information 162. The state information can include write cached data, state of the associated disks, status of an I/O request, and the like for the active application 132. The state information can then be stored in the memory mirror 116 via a mirror request 164. The active application 132 can then issue a write command 166 to store the data in the first set of disks 146 via the HBA 128. In another embodiment, the active applications 134 and 136 can perform similar functions and operations as the active application 132.

The hypervisor 144 can enable the standby CPU/memory node 108 to run the multiple standby applications 138, 140, and 142 at the same time, and can control which, if any, of the standby applications are active during a given period of time. The standby applications 138, 140, and 142 can be virtual standby applications for each of the active applications 132, 134, and 136. Multiple virtual machines can run on the standby CPU/memory node 108 and can share the resources of the standby CPU/memory to run the standby applications 138, 140, and 142. In an embodiment, there can be one virtual standby application for each active application, one virtual standby application for all of the active applications, one virtual standby application for a specific number of active applications, or the like.

While each of the active applications 132, 134, and 136 are functioning properly, the standby applications 138, 140, and 142 do not actively service any I/O requests, such that the standby CPU/memory node 108 can have enough resources to run the multiple standby applications at the same time. The standby applications 138, 140, and 142 can monitor the status of their respective active application 132, 134, or 136 to determine if one of the active applications has failed.

Figure 2:
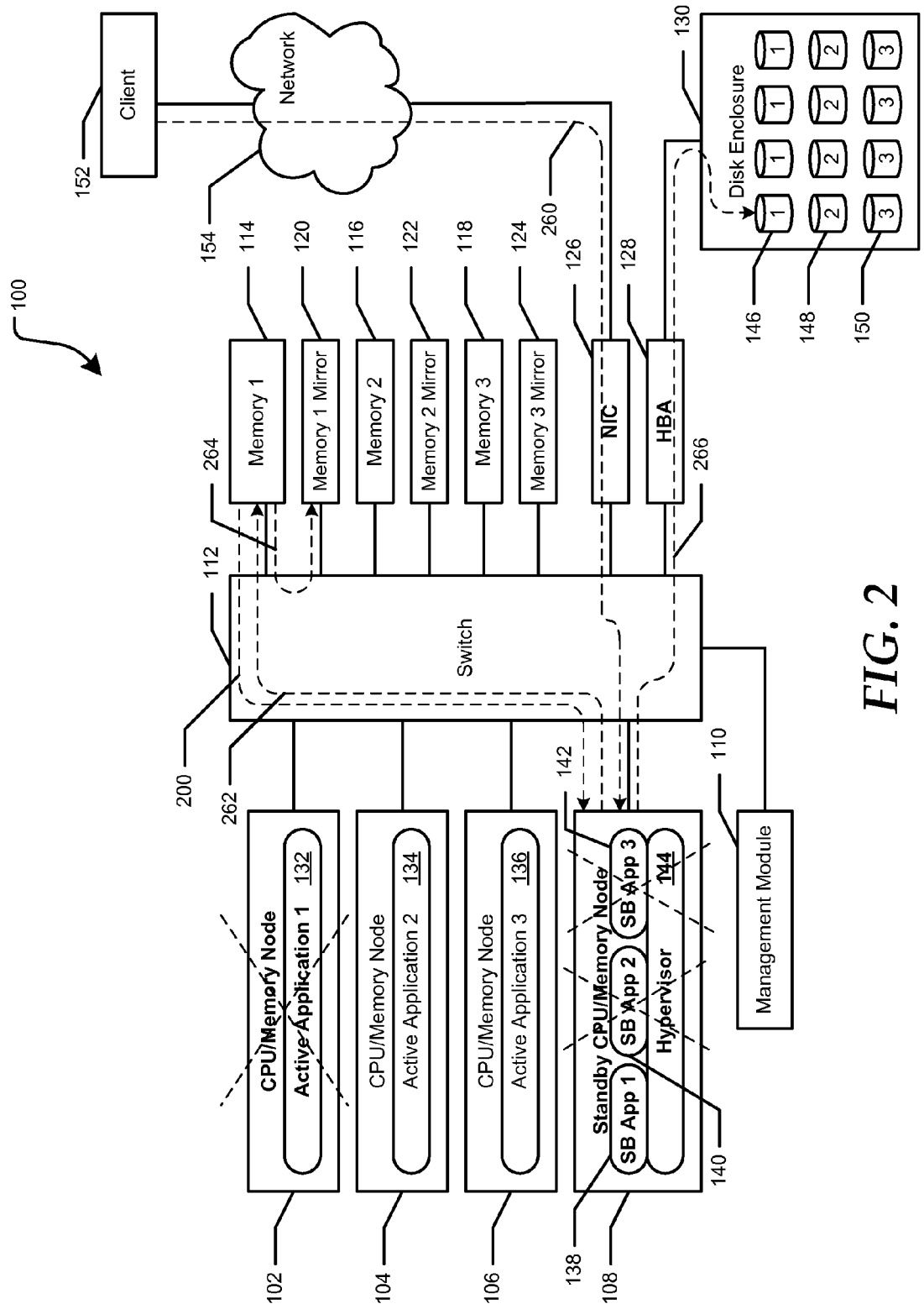
FIG. 2 is another block diagram of the storage array system.

When an active application has failed, such as the active application 132 as shown in FIG. 2, the hypervisor 144 can suspend the virtual machines running the standby applications 140 and 142. The hypervisor 144 can then provide standby application 138 with all of the memory, processing capabilities, and other resources of the standby CPU/memory node so that the standby application can actively service I/O requests from the client 152. The management module 110 can then reconfigure the switch 112 to provide the standby application 138 with control of the memory 114 and the memory mirror 116, and with control of the NIC 126 and the HBA 128 previously controlled by the failed active application 132. The management module 110 can also cause the switch 112 to direct I/O requests, received from the client 152, that are associated with the first set of disks 146 to the standby application 138 instead of the failed active application 132.

When the standby application 138 has taken control of the I/O requests, the standby application can retrieve the state information from the memory 114, via a state information read 200, to determine whether any I/O requests were being serviced by the active application 132 at the time of the failure. If the standby application 138 determines that there are I/O requests that need to be completed, the standby application can perform the operations for that I/O request, such as reading data from the first set of disks 146, writing data to the first set of disks, or the like. The standby application 138 can also continue to provide the client 152 with access to the first set of disks 146 while the active application 132 is not operational.

For example, the client 152 can send an I/O request 260 associated with writing data to the first set of disks 146 to the switch 112 via the network 154 and the NIC 126. The switch 112 can then direct the I/O request 260 to the standby application 138, which can process the I/O request and determine the data to write to the first set of disks 146. The standby application 138 can also send the I/O request and the data to be written to the memory 114 as state information 262. The state information can then be stored in the memory mirror 116 via a mirror request 264. The standby application 138 can then issue a write command 266 to store the data in the first set of disks 146 via the HBA 128.

When the failed active application 132 has been restarted after being repaired or replaced, the failover process between the active application and the standby application can be reversed. For example, the management module 110 can reconfigure the switch 112 to provide the active application 132 with control of the memory 114 and the memory mirror 116, and with control of the NIC 126 and the HBA 128 that were controlled by the standby application 138 during the down time of the active application. The switch 112 can also direct I/O requests, received from the client 152, that are associated with the first set of disks 146 to the active application 132 instead of the standby application 138.

When the active application 132 has taken control of the I/O requests, the active application can retrieve the state information from the memory 114 to determine whether there were any I/O requests being serviced by the standby application 138 when the active application was restarted. If the active application 132 determines that there are I/O requests that need to be completed, the active application can perform the operations for the I/O request. The hypervisor 144 can then restart the virtual machines running the standby applications 140 and 142, which along with standby application 138 can resume monitoring the respective active applications 132, 134, and 136 to determine if a failure occurs in one of the active applications.

While the failover has been described with respect to active application 132 and standby application 138, substantially similar failover operations can be performed for active applications 134 and 136, and standby applications 140 and 142 in the event of a failure of the active application 134 or 136.

Figure 3:
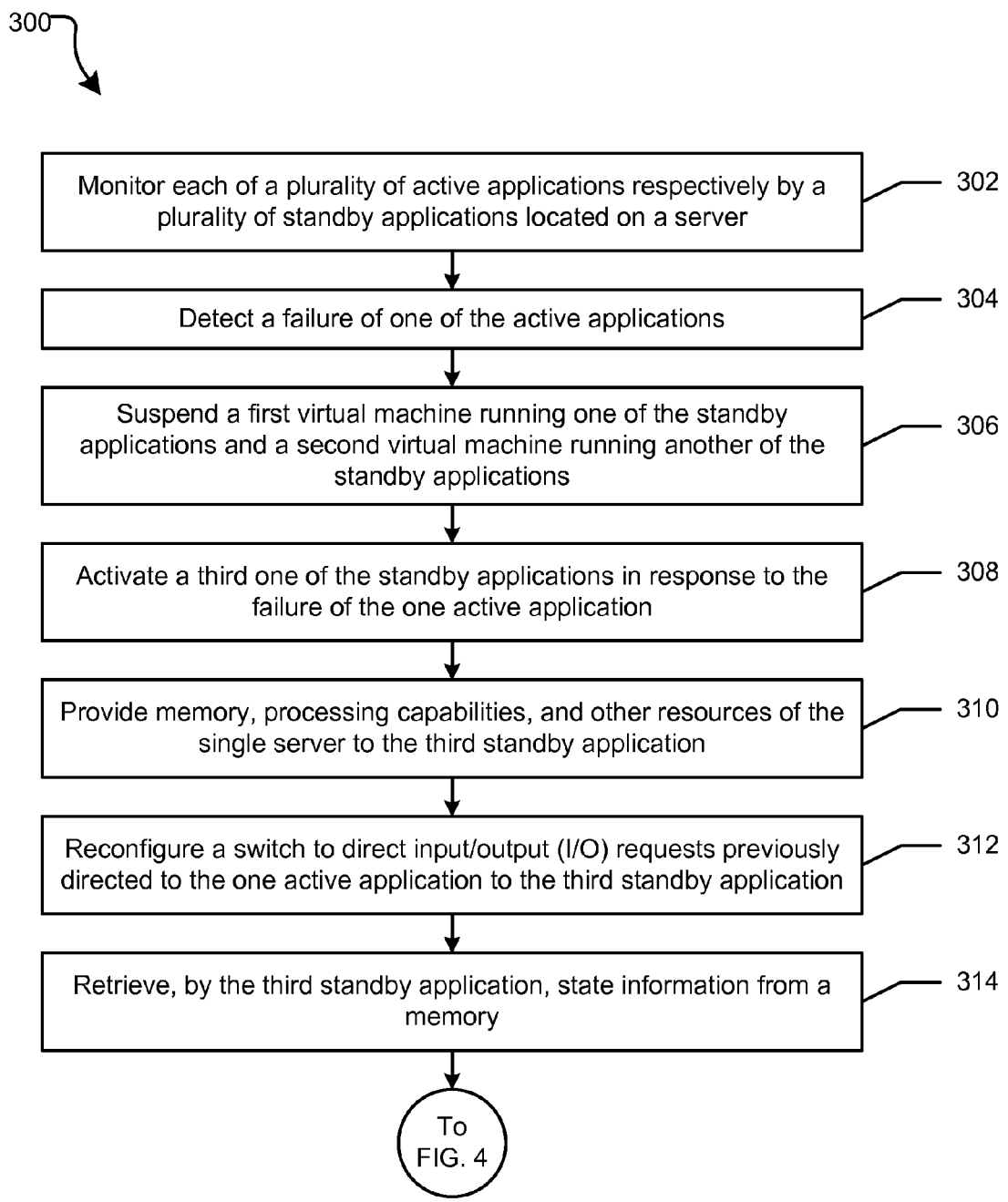
FIGS. 3 and 4 are a flow diagram of a method for providing failover from an active application to a standby application in the storage array system.
Figure 4:
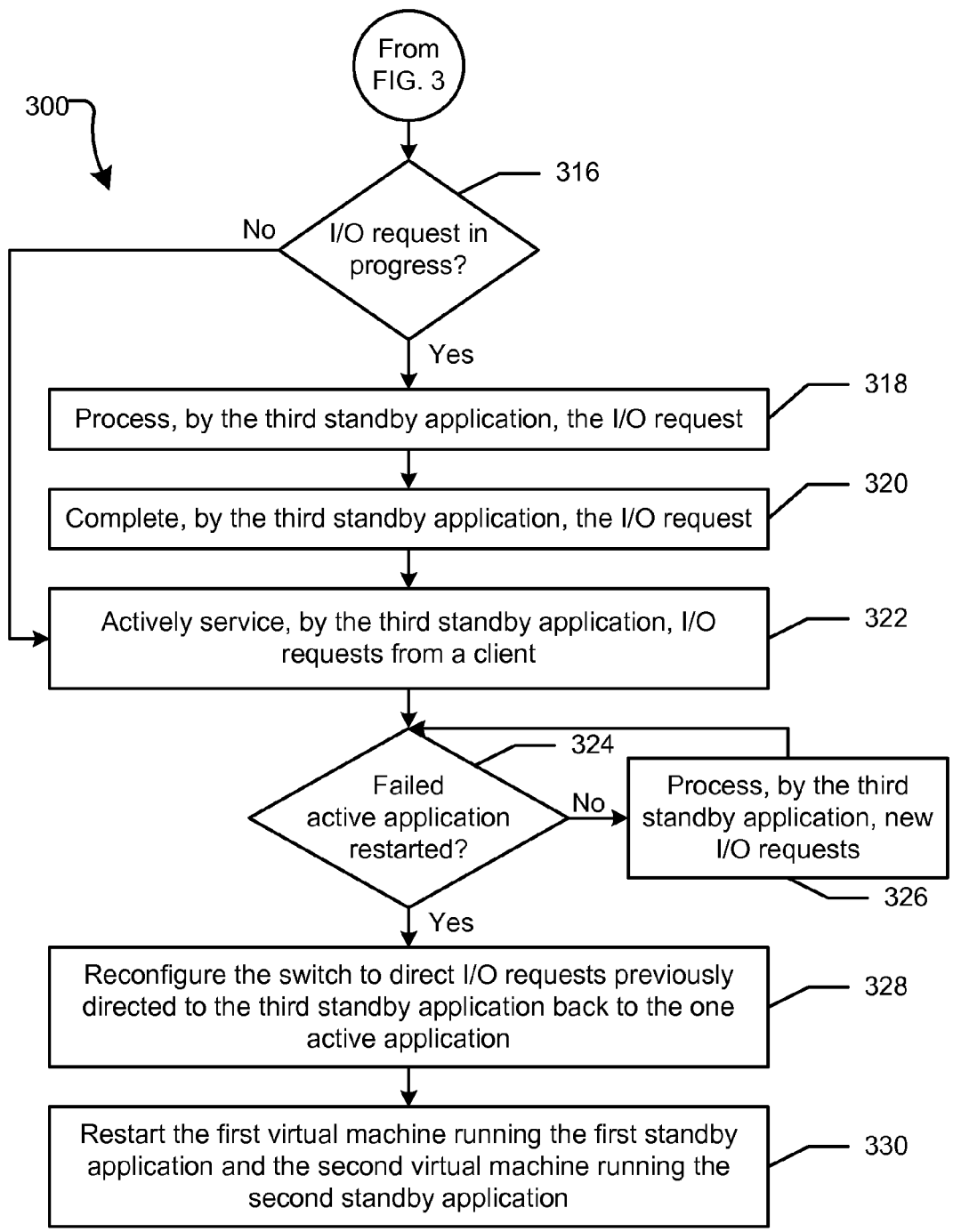

FIGS. 3 and 4 show a flow diagram of a method 300 for performing a failover from an active application to a standby application. At block 302, each of a plurality of active applications are monitored respectively by a plurality of standby applications located on a server. The active applications can each be located on a separate server. A failure of one of the active applications is detected at block 304. The failure of the one active application can be caused by a crash in the server running the active application, a loss of power to the server, or the like.

At block 306, a first virtual machine running a first standby application of the standby applications and a second virtual machine running a second standby application of the standby applications are suspended in response to the failure of the one active application. A third standby application of the standby applications is activated in response to the failure of the one active application at block 308. The first, second, and third standby applications can all be virtual applications located on a single server. At block 310, memory, processing capabilities, and other resources of the single server are provided to the third standby application.

At block 312, a switch is reconfigured to direct I/O requests previously directed to the one active application to the third standby application. At block 314, state information is retrieved from a memory by the third standby application. The memory can be a non-volatile random access memory. A determination is made whether a current I/O request is in progress based on the state information at block 316. If an I/O request is in progress, the I/O request is processed by the third standby application at block 318, otherwise the flow continues at block 322. At block 320, the I/O request is completed by the third standby application. The I/O request can be to read data from a disk, to write data to the disk, or the like. The third standby application can actively service I/O requests from a client in response to the memory, the processing capabilities, and the other resources of the single server being provided to the third standby application at block 322.

At block 324, a determination is made whether the one of the active applications is restarted. At block 326, if the one of the active applications is not restarted, new I/O requests are processed by the third standby application, and the flow repeats as stated above at block 324. If the one of the active applications is restarted, the switch is reconfigured to direct I/O requests previously directed to the third standby application back to the one active application at block 328. The restarted active application can use the state information in the memory to take control of and service the I/O requests that the standby application had been servicing. At block 330, the first virtual machine running the first standby application and the second virtual machine running the second standby application are restarted in response to the determination that the one active application is active again.

Figure 5:
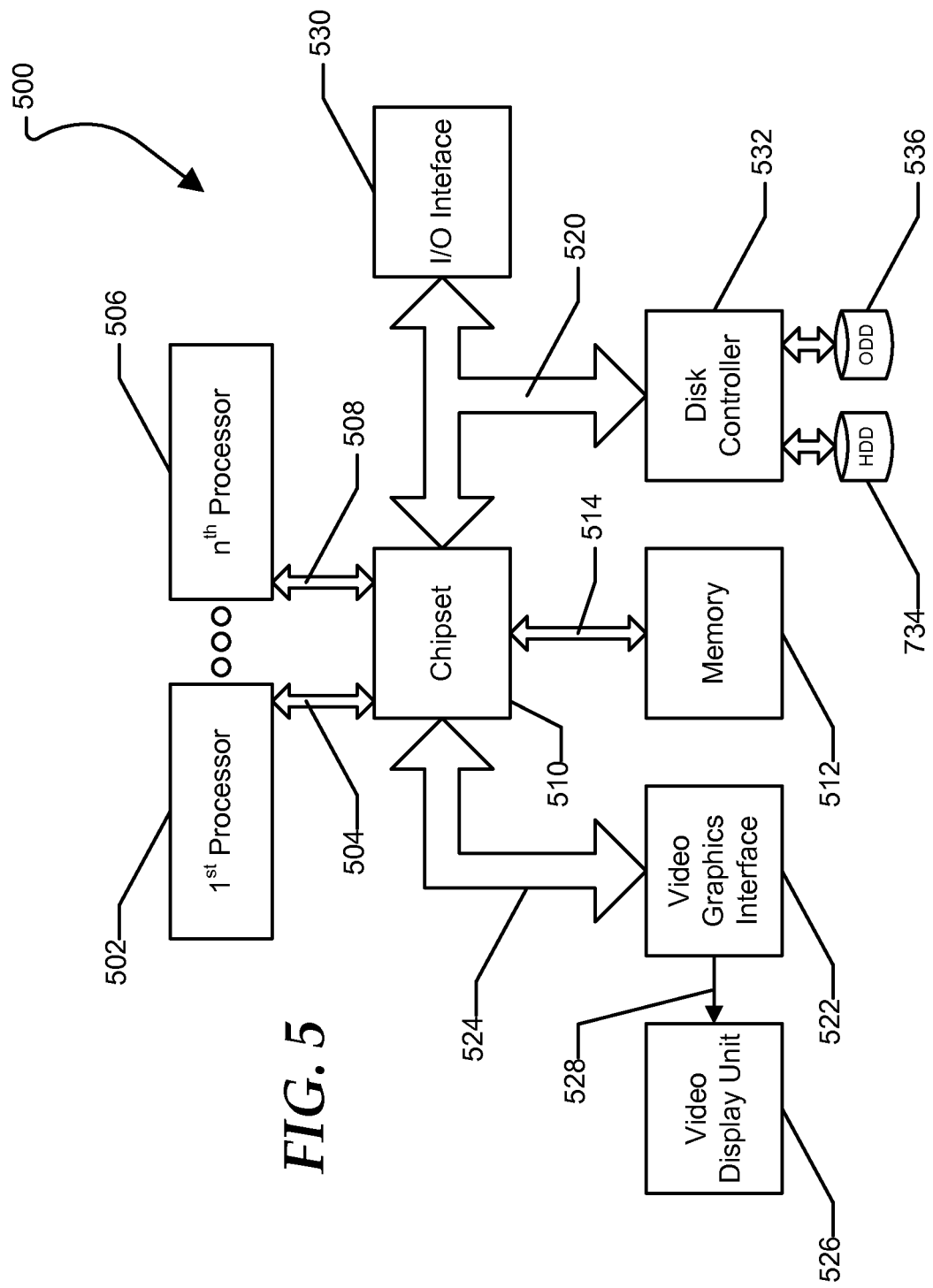
FIG. 5 is a block diagram of a general information handling system.

FIG. 5 illustrates a block diagram of a general information handling system, generally designated at 500. In one form, the information handling system 500 can be a computer system such as a server. As shown in FIG. 5, the information handling system 500 can include a first physical processor 502 coupled to a first host bus 504 and can further include additional processors generally designated as $n^{th}$ physical processor 506 coupled to a second host bus 508. The first physical processor 502 can be coupled to a chipset 510 via the first host bus 504. Further, the $n^{th}$ physical processor 506 can be coupled to the chipset 510 via the second host bus 508. The chipset 510 can support multiple processors and can allow for simultaneous processing of multiple processors and support the exchange of information within information handling system 500 during multiple processing operations.

According to one aspect, the chipset 510 can be referred to as a memory hub or a memory controller. For example, the chipset 510 can include an Accelerated Hub Architecture (AHA) that uses a dedicated bus to transfer data between first physical processor 502 and the $n^{th}$ physical processor 506. For example, the chipset 510, including an AHA enabled-chipset, can include a memory controller hub and an input/output (I/O) controller hub. As a memory controller hub, the chipset 510 can function to provide access to first physical processor 502 using first bus 504 and $n^{th}$ physical processor 506 using the second host bus 508. The chipset 510 can also provide a memory interface for accessing memory 512 using a memory bus 514. In a particular embodiment, the buses 504, 508, and 514 can be individual buses or part of the same bus. The chipset 510 can also provide bus control and can handle transfers between the buses 504, 508, and 514.

According to another aspect, the chipset 510 can be generally considered an application specific chipset that provides connectivity to various buses, and integrates other system functions. For example, the chipset 510 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 510. The chipset 510 can also be packaged as an application specific integrated circuit (ASIC).

The information handling system 500 can also include a video graphics interface 522 that can be coupled to the chipset 510 using a third host bus 524. In one form, the video graphics interface 522 can be an Accelerated Graphics Port (AGP) interface to display content within a video display unit 526. Other graphics interfaces may also be used. The video graphics interface 522 can provide a video display output 528 to the video display unit 526. The video display unit 526 can include one or more types of video displays such as a flat panel display (FPD) or other type of display device.

The information handling system 500 can also include an I/O interface 530 that can be connected via an I/O bus 520 to the chipset 510. The I/O interface 530 and I/O bus 520 can include industry standard buses or proprietary buses and respective interfaces or controllers. For example, the I/O bus 520 can also include a Peripheral Component Interconnect (PCI) bus or a high speed PCI-Express bus. In one embodiment, a PCI bus can be operated at approximately 56 MHz and a PCI-Express bus can be operated at approximately 528 MHz. PCI buses and PCI-Express buses can be provided to comply with industry standards for connecting and communicating between various PCI-enabled hardware devices. Other buses can also be provided in association with, or independent of, the I/O bus 520 including, but not limited to, industry standard buses or proprietary buses, such as Industry Standard Architecture (ISA), Small Computer Serial Interface (SCSI), Inter-Integrated Circuit (I$^2$C), System Packet Interface (SPI), or Universal Serial buses (USBs).

In an alternate embodiment, the chipset 510 can be a chipset employing a Northbridge/Southbridge chipset configuration (not illustrated). For example, a Northbridge portion of the chipset 510 can communicate with the first physical processor 502 and can control interaction with the memory 512, the I/O bus 520 that can be operable as a PCI bus, and activities for the video graphics interface 522. The Northbridge portion can also communicate with the first physical processor 502 using first bus 504 and the second bus 508 coupled to the n$^{th}$ physical processor 506. The chipset 510 can also include a Southbridge portion (not illustrated) of the chipset 510 and can handle I/O functions of the chipset 510. The Southbridge portion can manage the basic forms of I/O such as Universal Serial Bus (USB), serial I/O, audio outputs, Integrated Drive Electronics (IDE), and ISA I/O for the information handling system 500.

The information handling system 500 can further include a disk controller 532 coupled to the I/O bus 520, and connecting one or more internal disk drives such as a hard disk drive (HDD) 534 and an optical disk drive (ODD) 536 such as a Read/Write Compact Disk (R/W CD), a Read/Write Digital Video Disk (R/W DVD), a Read/Write mini-Digital Video Disk (R/W mini-DVD), or other type of optical disk drive.

Although only a few exemplary embodiments have been described in detail above, those skilled in the art will readily appreciate that many modifications are possible in the exemplary embodiments without materially departing from the novel teachings and advantages of the embodiments of the present disclosure. For example, the methods described in the present disclosure can be stored as instructions in a computer readable medium to cause a processor, such as chipset 510, to perform the method. Additionally, the methods described in the present disclosure can be stored as instructions in a non-transitory computer readable medium, such as a hard disk drive, a solid state drive, a flash memory, and the like. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:
1. An information handling system comprising:
a first memory for storing first state information;
a second memory for storing second state information;
a first server including a first active application for servicing first input/output requests associated with a first disk, and for storing the first state information in the first memory;
a second server including a second active application for servicing second input/output requests associated with a second disk, and for storing the second state information in the second memory; and
a third server including a first standby application and a second standby application, the third server configured to monitor the first active application and the second active application, to detect a failure of the first active application, to suspend the second standby application running on a first virtual machine in response to the failure of the first active application, and to activate the first standby application running on a second virtual machine in response to the failure of the first active application, to provide memory, processing capabilities, and other resources of the server to the first standby application in response to the failure of the first active application, wherein the first standby application is configured to actively service the first input/output requests directed to the first active application in response to the failure of the first active application and in response to the memory, the processing capabilities, and the other resources of the server being provided to the second standby application.

2. The information handling system of claim 1 further comprising:
a switch to direct the first input/output request to the first active application and the second input/output request to the second active application.

3. The information handling system of claim 2 further comprising:
a management module in communication with the switch, the management module configured to reconfigure the switch to direct the first input/output requests previously directed to the first active application to the first standby application.

4. The information handling system of claim 3 wherein the management module is further configured to reconfigure the switch to direct the first input/output requests to the first active applications instead of the first standby application in response to the first active application being restarted.

5. The information handling system of claim 1 wherein the first standby application is further configured to retrieve the first state information from the first memory, to determine whether a current input/output request is in progress based on the first state information, and if the current input/output request is in progress, processing and completing the input/output request.

6. The information handling system of claim 1 wherein the third server is further configured to determine that the first active application has been restarted, and to restart the second standby application in response to the one active application being restarted.

7. The information handling system of claim 1 wherein the first memory and the second memory are non-volatile random access memories.

8. The information handling system of claim 1 wherein the first input/output requests are selected from a group consisting of a request to read data from a disk and a request to write data to the disk.

9. A method comprising:
monitoring, by a server including a plurality of standby applications, a plurality of active applications;
detecting a failure of one of the active applications;

suspending a first virtual machine running a first standby application of the standby applications in response to the failure of the one active application;

activating a second standby application of the standby applications running on a second virtual machine in response to the failure of the one active application;

providing memory, processing capabilities, and other resources of the server to the second standby application in response to the failure of the one active application;

reconfiguring a switch to direct input/output requests from a client previously directed to the one active application to the second standby application; and actively servicing, by the second standby application, the input/output requests from the client in response detecting the failure of the one active application and in response to the memory, the processing capabilities, and the other resources of the server being provided to the second standby application.

10. The method of claim 9 further comprising:

retrieving, by the second standby application, state information from a memory;

determining whether a current input/output request is in progress based on the state information; and if the current input/output request is in progress, processing and completing, by the second standby application, the input/output request.

11. The method of claim 10 further comprising:

determining that the one active application has been restarted;

reconfiguring the switch to direct the input/output requests to the one active application instead of the second standby application in response to the one active application being restarted; and restarting the first virtual machine running the first standby application in response to the one active application being restarted.

12. The method of claim 9 wherein the failure of the one active application is caused by a server crashing, the server losing power, or any combination thereof.

13. The method of claim 9 wherein the plurality of standby applications are virtual applications located on the server.

14. The method of claim 9 wherein the memory is a non-volatile random access memory.

15. The method of claim 9 wherein the current input/output request is to read data from a disk, to write data to the disk, or any combination thereof.

16. A method comprising:

monitoring, by a server including a plurality of standby applications, a plurality of active applications;

detecting a failure of one of the active applications;

suspending a first virtual machine running a first standby application of the standby applications in response to the failure of the one active application;

activating a second standby application of the standby applications running on a second virtual machine in response to the failure of the one active application;

providing memory, processing capabilities, and other resources of the server to the second standby application;

reconfiguring a switch to direct input/output requests from a client previously directed to the one active application to the second standby application;

actively servicing, by the second standby application, the input/output requests from the client in response to the memory, the processing capabilities, and the other resources of the server being provided to the second standby application;

retrieving, by the second standby application, state information from a memory;

determining whether a current input/output request is in progress based on the state information; and if the current input/output request is in progress, processing and completing, by the second standby application, the input/output request.

17. The method of claim 16 further comprising:

determining that the one active application has been restarted;

reconfiguring the switch to direct the input/output requests to the one active application instead of the second standby application in response to the one active application being restarted; and restarting the first virtual machine running the first standby application in response to the one active application being restarted.

18. The method of claim 16 further comprising:

suspending a third virtual machine running a third standby application of the standby applications in response to the failure of the one active application; and restarting the third virtual machine running the third standby application in response to the one active application being restarted.

19. The method of claim 16 wherein each of the active applications are located on separate servers.

20. The method of claim 16 wherein the plurality of standby applications are virtual applications located on the server.

* * * * *